US007735373B2

(12) United States Patent
Cho et al.

(10) Patent No.: US 7,735,373 B2
(45) Date of Patent: Jun. 15, 2010

(54) APPARATUS FOR MEASURING PRESSURE IN A VESSEL USING MAGNETOSTRICTIVE ACOUSTIC TRANSDUCER

(75) Inventors: Seung Hyun Cho, Gyeonggi-do (KR); Bongyoung Ahn, Daejeon (KR); Seung Soo Hong, Daejeon (KR); Yong Hyeon Shin, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 16 days.

(21) Appl. No.: 12/190,901

(22) Filed: Aug. 13, 2008

(65) Prior Publication Data

US 2009/0279391 A1 Nov. 12, 2009

(30) Foreign Application Priority Data

May 6, 2008 (KR) ..................... 10-2008-0041717

(51) Int. Cl.
*G01L 9/10* (2006.01)

(52) U.S. Cl. .......................................... 73/722; 73/735

(58) Field of Classification Search ....................... None
See application file for complete search history.

(56) References Cited

U.S. PATENT DOCUMENTS

| | | | | |
|---|---|---|---|---|
| 2,511,178 | A * | 6/1950 | Roters | 73/862.333 |
| 3,828,333 | A * | 8/1974 | Bryant | 340/626 |
| 4,011,758 | A * | 3/1977 | Reenstra et al. | 73/728 |
| 4,495,821 | A * | 1/1985 | Terhune | 73/753 |
| 4,720,676 | A * | 1/1988 | Anderson et al. | 324/207.17 |
| 5,165,284 | A * | 11/1992 | Shoji et al. | 73/728 |
| 5,492,017 | A * | 2/1996 | Jennings et al. | 73/728 |
| 6,393,921 | B1 * | 5/2002 | Grimes et al. | 73/728 |
| 2004/0093951 | A1 * | 5/2004 | Viola et al. | 73/728 |

* cited by examiner

*Primary Examiner*—Andre J Allen
(74) *Attorney, Agent, or Firm*—Vidas, Arrett & Steinkraus

(57) ABSTRACT

The present invention relates to an apparatus for measuring pressure inside a vessel using a magnetostrictive acoustic transducer. The apparatus includes a magnetostrictive acoustic transducer, including an exciting coil unit wound on a first magnetization yoke disposed on an outer position of a vessel, a receiving coil unit wound on the first magnetization yoke, and a vibration unit disposed on an inner position of the vessel in which the first magnetization yoke is installed; a control unit for supplying a predetermined excitation current signal to the exciting coil unit; and a pressure measuring unit for measuring an internal pressure of the vessel based on an ultrasonic wave signal received by the receiving coil unit and an excitation current signal into the exciting coil unit.

15 Claims, 6 Drawing Sheets

APPARATUS FOR MEASURING PRESSURE IN A VESSEL USING MAGNETOSTRICTIVE ACOUSTIC TRANSDUCER

BACKGROUND OF THE INVENTION

1. Field of the Invention

The present invention relates to a pressure measuring apparatus based on magnetostriction, and more particularly, to an apparatus in which a coil is constructed outside a vessel whose pressure will be measured, and ultrasonic waves necessary for pressure measurement are directly generated and measured inside the vessel using a magnetostrictive ultrasonic transducer having a vibration unit placed inside the vessel, so that an internal pressure of the vessel can be measured even in a low vacuum or high vacuum and under high atmospheric pressure or higher. Furthermore, the present invention relates to an apparatus that can transmit ultrasonic waves necessary for pressure measurement without damage or modification of a vessel.

2. Background of the Related Art

In general, in various manufacturing process such as the semiconductor and LCD fabrication, the measurement of the internal pressure of a vessel plays an important role in parameter control in process. When it is sought to measure the degree of vacuum, that is, the pressure of a vessel, a capacitance diaphragm gauge (CDG) is generally used.

Such a capacitance diaphragm gauge is configured such that it is mounted inside a vessel whose pressure will be measured and measures the pressure of the vessel. However, this method using the capacitance diaphragm gauge is complicated in that, before the degree of vacuum or pressure inside the vessel is measured using the capacitance diaphragm gauge, the degree of leakage of vacuum must be checked and, after the capacitance diaphragm gauge is constructed, the inside of the vessel must be made vacuum-tight. Furthermore, the capacitance diaphragm gauge has a limitation in that it can be used only in a low vacuum state.

A pressure measuring apparatus, which generates and receives ultrasonic waves outside the vessel by solving the problems, has a merit in that it is not required to check the degree of leakage of the vessel. However, a vessel is generally made of metal material, such as stainless steel, so as to withstand a difference between an internal pressure and an external pressure. Thus, when it is desired to transmit ultrasonic waves from the outside of the vessel to the inside thereof in order to measure the pressure inside the vessel, there is a disadvantage in that the ultrasonic waves are hardly transmitted to gas inside the vessel due to a great difference in acoustic impedance between the material of the vessel and the internal gas. Similarly, there is also the same problem in that the ultrasonic waves are rarely transmitted from the inside to the ultrasound measurement device at the outside of the vessel. Therefore, there are problems in that it is difficult to transmit ultrasonic waves as described above and pressure measurement is difficult since the transmitting efficiency of ultrasonic waves between the outside and the inside of the vessel is very low. Therefore, there is a need for an apparatus which can efficiently transmit ultrasonic waves so as to measure pressure inside a vessel using the ultrasonic waves.

SUMMARY OF THE INVENTION

Accordingly, the present invention has been made in an effort to solve the above problems occurring in the prior art, and it is an object of the present invention to minimize the possibility of leakage when pressure inside a vessel is measured and increase the ultrasonic transmitting efficiency in such a manner that, in using a magnetostrictive ultrasonic transducer, coils are disposed outside the vessel and the vibration unit is provided inside the vessel in order to directly generate ultrasonic waves inside the vessel without damage or modification of the vessel.

Another object of the present invention is to provide an apparatus, which can increase the sensitivity of measurement of ultrasonic waves traveling inside a vessel using a reflection plate or/and resonance, improve accuracy when an internal pressure or the degree of vacuum inside the vessel is measured, and can measure inside in a high vacuum or under a high atmospheric pressure ore more.

As concrete means for accomplishing the above objects, a pressure measuring apparatus using a magnetostrictive acoustic transducer includes a magnetostrictive exciting/receiving transducer comprising an exciting coil unit wound on a first magnetization yoke disposed on the outer position of the vessel, a receiving coil unit wound on the first magnetization yoke, and a vibration unit disposed on the inner position of the vessel in which the first magnetization yoke is installed; a control unit for supplying a predetermined excitation current signal to the exciting coil unit 120; and a pressure measuring unit for measuring an internal pressure of the vessel based on an ultrasonic wave signal received by the receiving coil unit and an excitation current signal into the exciting coil unit.

The vibration unit may include a vibration unit magnetization yoke and a magnetostrictive vibrating membrane.

The magnetostrictive vibrating membrane may be composed of a single layer or a plurality of layers. The single layer or the plurality of layers constituting the magnetostrictive vibrating membrane may include a material with strong magnetostriction, such as nickel, iron-cobalt alloy or Galfenol material.

The vibration unit may include a magnetostrictive vibrating element and an acoustic impedance matching layer.

The magnetostrictive vibrating element may be made of a material with strong magnetostriction, such as Terfenol-D.

A reflection plate for reflecting the ultrasonic waves may further be included inside the vessel.

The first magnetization yoke may be made of a material with a high magnetic permeability, such as ferrite.

The control unit may supply a predetermined excitation current signal to the magnetostrictive exciting/receiving transducer such that a resonance of the ultrasonic waves is induced between the vibration unit and the inner face of the vessel wall.

The control unit may supply a predetermined excitation current signal to the magnetostrictive exciting/receiving transducer such that a resonance of the ultrasonic waves is induced between the vibration unit and the reflection plate.

As another concrete means for accomplishing the above objects, a pressure measuring apparatus using a magnetostrictive acoustic transducer includes a magnetostrictive exciting transducer comprising an exciting coil unit wound on a first magnetization yoke disposed on the outer position of a vessel and an exciting vibration unit 250 disposed on the inner position of the vessel 10 in which the first magnetization yoke is disposed; a magnetostrictive receiving transducer comprising a receiving coil unit wound on a second magnetization yoke disposed on the other outer position of the vessel and a receiving vibration unit disposed on the other inner position of the vessel in which the second magnetization yoke is disposed; a control unit for supplying a predetermined excitation current signal to the exciting coil unit; and a pressure measuring unit for measuring an internal pressure of the vessel based on an ultrasonic wave signal received by the receiving coil unit and an excitation current signal into the exciting coil unit.

The magnetostrictive exciting transducer and the magnetostrictive receiving transducer are place on the same axis line (A-A').

The first magnetization yoke and the second magnetization yoke may be made of a material with a high magnetic permeability, such as ferrite.

The control unit may supply a predetermined excitation current signal to the magnetostrictive exciting transducer such that a resonance of ultrasonic waves generated from the magnetostrictive exciting transducer is induced between the vibration unit of the magnetostrictive exciting transducer and the magnetostrictive receiving transducer.

The exciting vibration unit may include an exciting vibration unit magnetization yoke and an exciting magnetostrictive vibrating membrane.

The receiving vibration unit may include a receiving vibration unit magnetization yoke and a receiving magnetostrictive vibrating membrane.

The exciting vibration unit and the receiving vibration unit may include a magnetostrictive vibrating element and an acoustic impedance matching layer and a magnetostrictive vibrating element and an acoustic impedance matching layer, respectively.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 2:
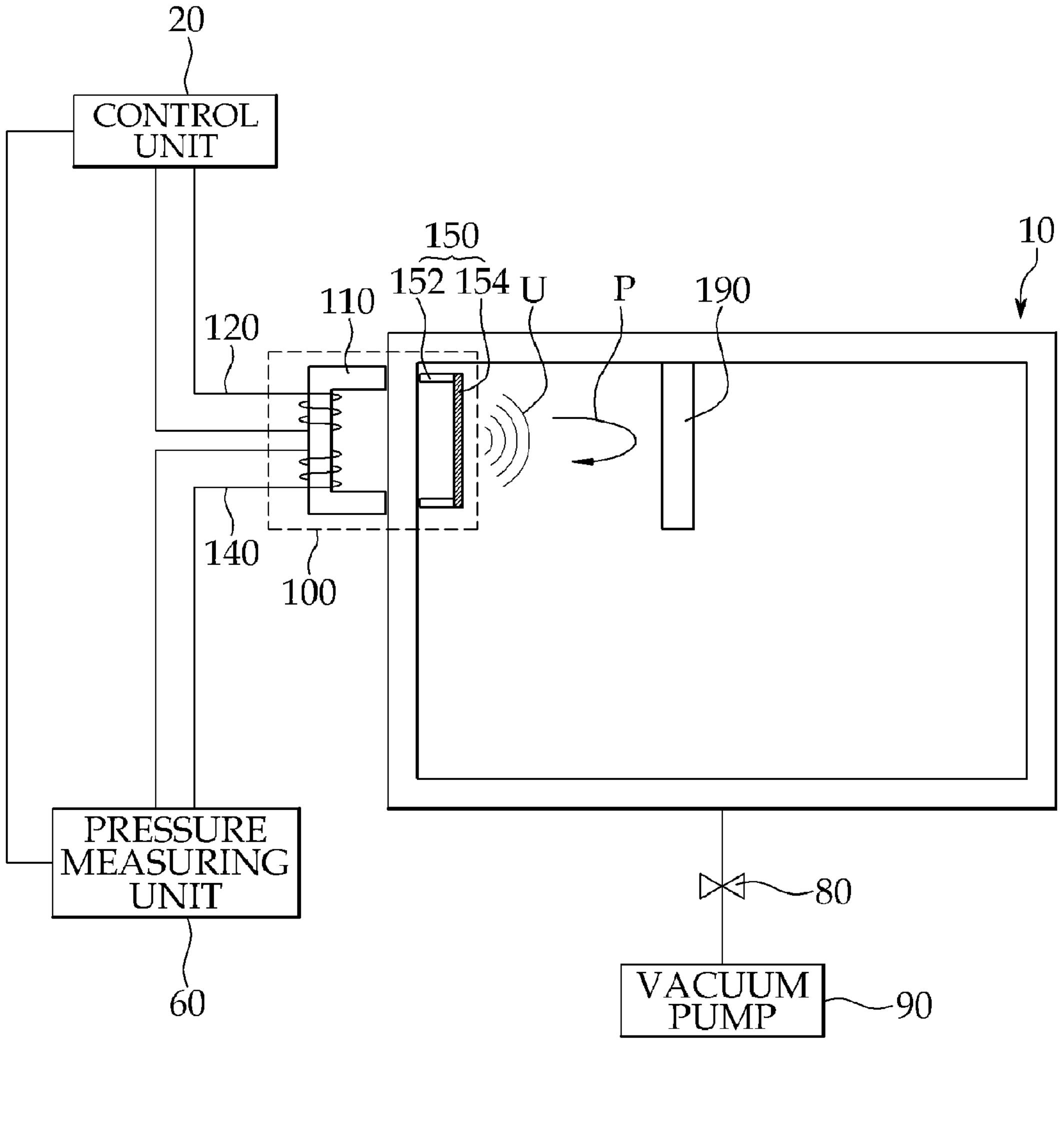
FIG. 2 is a diagram showing a state where a pressure measuring apparatus using a magnetostrictive acoustic transducer in accordance with a second embodiment of the present invention is constructed.
Figure 3:
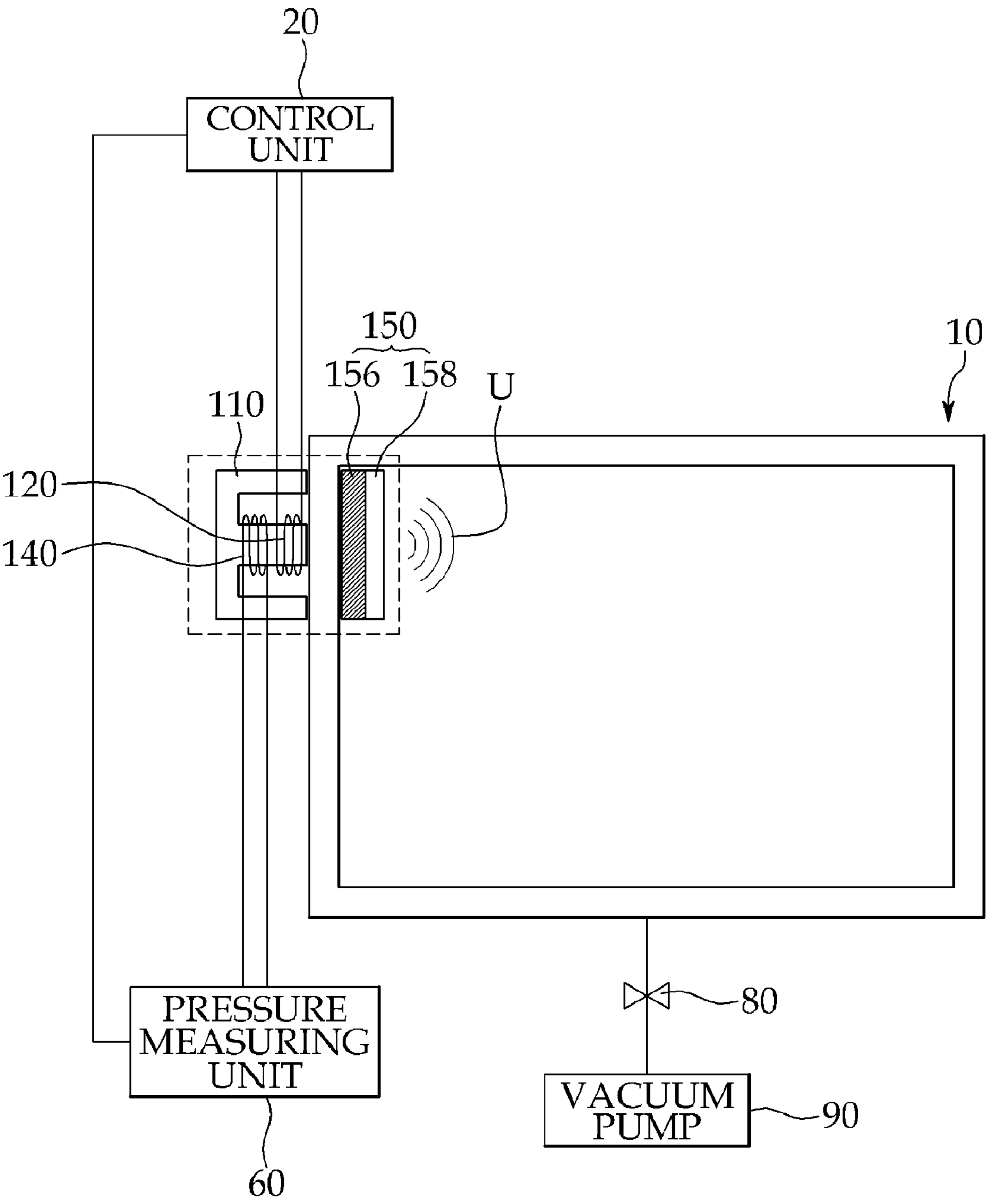
FIG. 3 is a diagram showing a state where a pressure measuring apparatus using a magnetostrictive acoustic transducer in accordance with a third embodiment of the present invention is constructed.

The present invention will now be described in detail in connection with specific embodiments with reference to the accompanying drawings. In FIG. 1 to FIG. 3 used hereinafter, reference numeral 'U' denotes ultrasonic waves traveling inside a vessel 10, and reference numeral 'P' denotes the travel path of the ultrasonic waves U inside the vessel 10.

<Construction of Pressure Measuring Apparatus>

First Embodiment

Figure 1A:
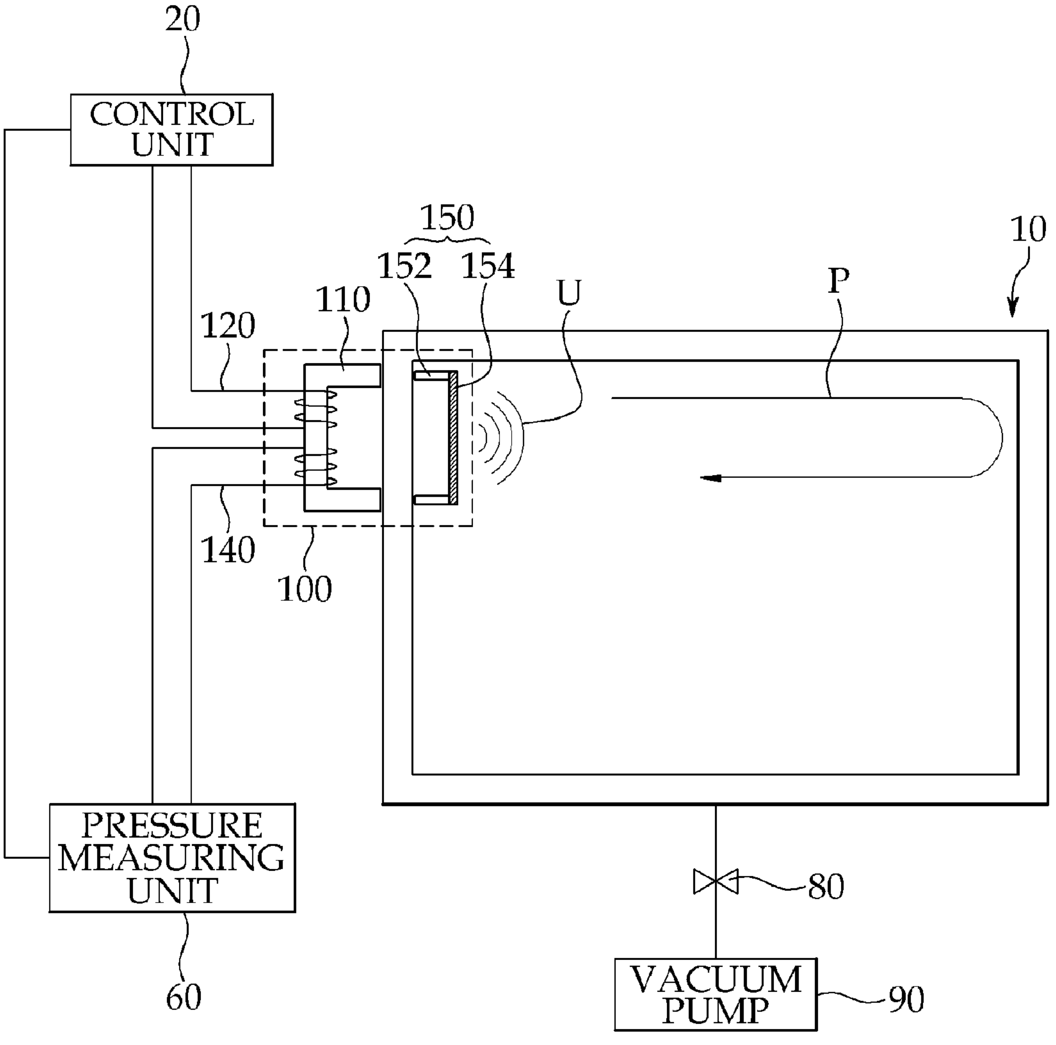
FIGS. 1*a* and 1*b* are diagrams showing a state where a pressure measuring apparatus using a magnetostrictive acoustic transducer in accordance with a first embodiment of the present invention is constructed.

FIG. 1*a* is a diagram showing a pressure measuring apparatus using a magnetostrictive acoustic transducer in accordance with a first embodiment of the present invention. The pressure measuring apparatus includes a magnetostrictive exciting/receiving transducer 100 established on a vessel wall 10, a control unit 20 for supplying a predetermined excitation current signal to the magnetostrictive exciting/receiving transducer 100, and a pressure measuring unit 60 for measuring an internal pressure of the vessel 10 based on an ultrasonic wave signal received by the receiving coil unit and an excitation current signal into the exciting coil unit.

The magnetostrictive exciting/receiving transducer 100 includes a first magnetization yoke 110, an exciting coil unit 120 wound on the first magnetization yoke 110, a receiving coil unit 140, and a vibration unit 150 for generating and receiving ultrasonic waves. The exciting coil unit 120 and the receiving coil unit 140 wound on the first magnetization yoke 110 are disposed outside the vessel 10, and the vibration unit 150 is disposed inside the vessel 10.

The first magnetization yoke 110 is preferably made of a material with a high magnetic permeability, such as ferrite.

The vibration unit 150 comprises a vibration unit magnetization yoke 152 and a magnetostrictive vibrating membrane 154. The vibration unit magnetization yoke 152 is preferably made of a material with a high magnetic permeability, such as ferrite, in the same manner as the first magnetization yoke 110. The magnetostrictive vibrating membrane 154 can include a single layer or a plurality of layers and can include materials with strong magnetostriction. The magnetostrictive materials can include alloy such as nickel, cobalt and iron, which are ferromagnetic materials, and preferably iron-cobalt alloy materials. The iron-cobalt alloy is advantageous in that it has the magnetostrictive strain, which is over three times greater than that of nickel and has good manufacturability. In the case in which the magnetostrictive vibrating membrane consists of plural layers, the respective layers can have different materials.

Figure 1B:
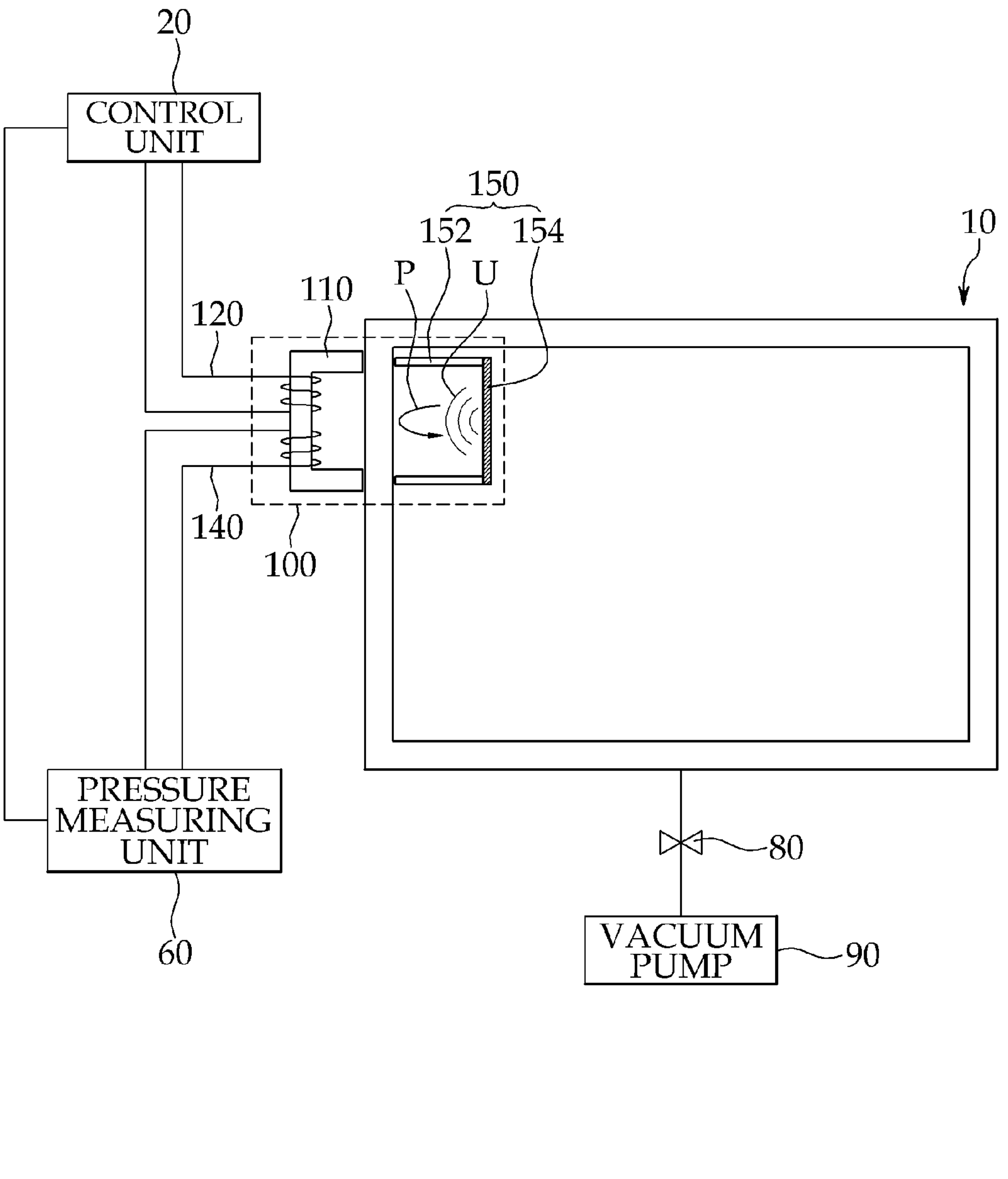

Ultrasonic waves are generated to the inner face of the vessel wall 10 by means of vibration of the vibration unit 150, particularly, the magnetostrictive vibrating membrane 154. Ultrasonic waves can also be generated to the inner face of the vessel wall 10 in which the magnetostrictive exciting/receiving transducer 100 is constructed (a travel path P), as shown in FIG. 1*b*.

The control unit 20 controls the excitation signal supplied to the exciting coil unit 120, to finally control the magnetic field applied to the vibration unit 150. In the present invention, preferably, a resonance of ultrasonic waves is induced to increase the sensitivity. This resonance is very useful when generation of ultrasonic waves with a high output is necessary to measure pressure as in a high vacuum, etc. Accordingly, the control unit 20 supplies a predetermined excitation current signal to the magnetostrictive exciting/receiving transducer 100 so that ultrasonic waves with a predetermined frequency and signal waveform, which induce a resonance between the vibration unit 150 and the inner face of the vessel wall 10, are generated.

The pressure measuring unit 60 measures an internal pressure of the vessel 10 based on a signal of the ultrasonic waves received by the receiving coil unit 140, that is, a signal of the ultrasonic waves traveling inside the vessel 10, and an excitation current signal, that is, the ultrasonic waves transmitted to the inside of the vessel 10. The signal of the ultrasonic waves includes information, such as an amplitude and signal waveform of the ultrasonic waves that have been changed while traveling inside the vessel 10. The information can be basic data for measuring the internal pressure of the vessel 10 together with the traveling time inside the vessel, etc. To measure the internal pressure of the vessel 10 based on the pieces of information is evident to those having ordinary skill in the art, and detailed description thereof is omitted.

The pressure measuring unit 60 is preferably connected to the control unit 20 in order to acquire information about the signal of the excitation current signal into the exciting coil unit as well as the signal of the ultrasonic waves received by the receiving coil unit 140.

Preferably, a filter unit (not shown) for removing noise from the signal of the ultrasonic waves, which is received by the receiving coil unit 140, before the signal is applied to the pressure measuring unit 60 can be further added.

An embodiment of the filter unit may employ a highpass filter (HPF) or a bandpass filter (BPF).

Second Embodiment

FIG. 2 is a diagram showing a pressure measuring apparatus using a magnetostrictive acoustic transducer in accordance with a second embodiment of the present invention. As shown in FIG. 2, a reflection plate 190 is further included in the construction of FIG. 1.

The reflection plate 190 functions to reduce attenuation of ultrasonic waves traveling inside the vessel 10 and is disposed close to the magnetostrictive exciting/receiving transducer 100.

The reflection plate 190 can include any kind of material that can reflect ultrasonic waves traveling inside the vessel 10. A position where the reflection plate 190 is constructed is preferably decided in consideration of resonance conditions. For example, the position where the reflection plate 190 is constructed can be a position where the wavelength λ of ultrasonic waves transmitted into the inside of the vessel 10 becomes ½ or a position where the wavelength λ of ultrasonic waves transmitted into the vessel 10 becomes a multiple $$\left(\frac{\lambda}{2}n\right).$$

This is only an installation example of the reflection plate 190, but the construction of the present invention is not limited thereto.

Third Embodiment

FIG. 3 is a diagram showing a pressure measuring apparatus using a magnetostrictive acoustic transducer in accordance with a third embodiment of the present invention. As shown in FIG. 3, a vibration unit 150 can include a magnetostrictive vibrating element 156 and an acoustic impedance matching layer 158. The remaining constituent elements of FIG. 3 are identical to those of other constructions including the first embodiment, and detailed description thereof is omitted.

The magnetostrictive vibrating element 156 is preferably made of a material such as Terfenol-D having strong magnetostriction.

The acoustic impedance matching layer 158 comprises a single layer or a plurality of layers. In the case in which the acoustic impedance matching layer 158 is comprised a plurality of layers, the respective layers have different acoustic impedance.

Fourth Embodiment

Figure 4:
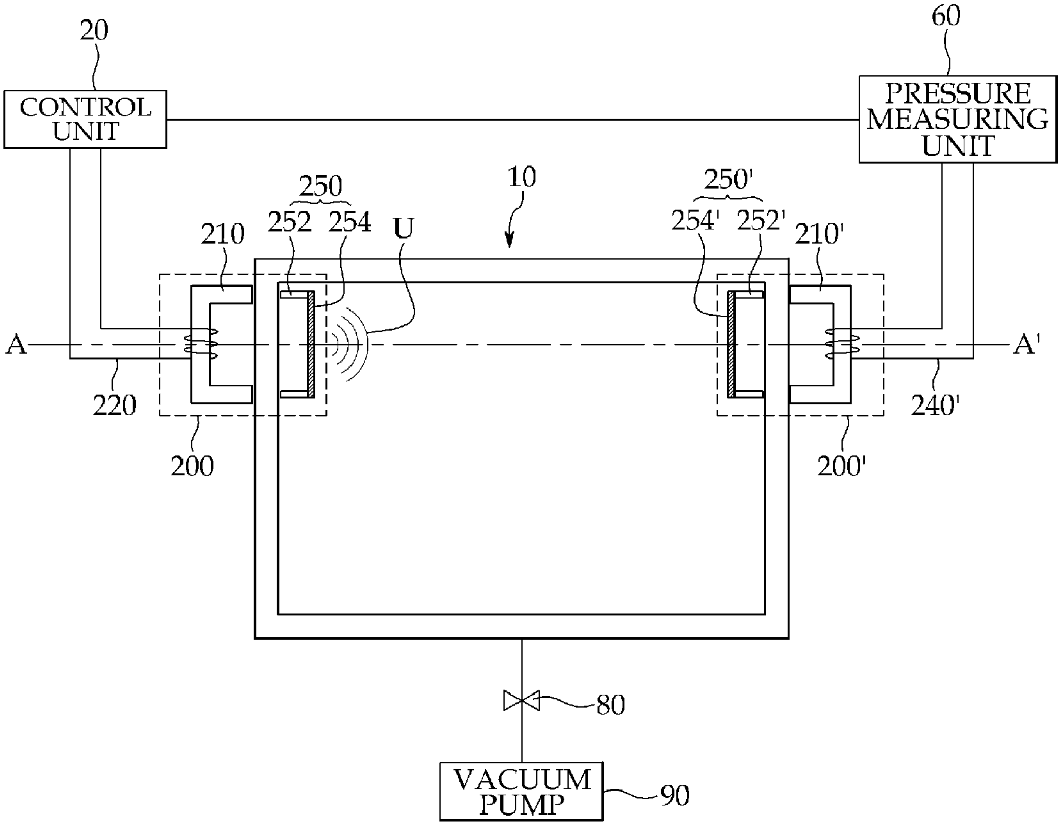
FIG. 4 is a diagram showing a state where a pressure measuring apparatus using a magnetostrictive acoustic transducer in accordance with a fourth embodiment of the present invention is constructed.

FIG. 4 is a diagram showing a pressure measuring apparatus using a magnetostrictive acoustic transducer in accordance with a fourth embodiment of the present invention. The pressure measuring apparatus shown in FIG. 4 can include a part for exciting ultrasonic waves and a part for receiving ultrasonic waves separately. The part for exciting ultrasonic waves is a magnetostrictive exciting transducer 200, and the part for receiving ultrasonic waves traveling inside a vessel is a magnetostrictive receiving transducer 200'.

The magnetostrictive exciting transducer 200 includes a first magnetization yoke 210, and an exciting coil unit 220 disposed on the outer position of the vessel 10, and an exciting vibration unit 250 disposed on the inner position of the vessel of the vessel 10.

The first magnetization yoke 210 is disposed on the outer side of the vessel 10 and has the exciting coil unit 220 wound thereon. The exciting coil unit 220 receives an excitation current signal from a control unit 20 and applies magnetic field for an amplitude and waveform of ultrasonic waves transmitted into the inside of the vessel 10 under the control of the control unit 20. The first magnetization yoke 210 can be made of a material having a high magnetic permeability, such as ferrite.

The exciting vibration unit 250 can include an exciting vibration unit magnetization yoke 252 and an exciting magnetostrictive vibrating membrane 254. The exciting vibration unit magnetization yoke 252 preferably made of a material having a high magnetic permeability, such as ferrite. The exciting vibration unit 250 generates ultrasonic waves, when the exciting magnetostrictive vibrating membrane 254 is vibrated under the influence of magnetic field generated by the first magnetization yoke 210 and the exciting coil unit 220, to the inside of the vessel 10.

The magnetostrictive receiving transducer 200' has the same basic construction as that of the magnetostrictive exciting transducer 200 and includes a second magnetization yoke 210', a receiving coil unit 240' and a receiving vibration unit 250'. The receiving vibration unit 250' can include a receiving vibration unit magnetization yoke 252' and a receiving magnetostrictive vibrating membrane 254'.

The second magnetization yoke 210' and/or the receiving vibration unit magnetization yoke 252' are/is preferably made of a material having a high magnetic permeability, such as ferrite.

The exciting magnetostrictive vibrating membrane 254 and the receiving magnetostrictive vibrating membrane 254' can be made of magnetostrictive material. This is the same as that of the magnetostrictive vibrating membrane 154 of the first embodiment, and description thereof is omitted.

A position where the magnetostrictive receiving transducer 200' is constructed is the other wall of the vessel 10 where the magnetostrictive exciting transducer 200 is constructed.

The receiving coil unit 240' of the magnetostrictive receiving transducer 200' is connected to a pressure measuring unit 60 and receives signal information of ultrasonic waves traveling inside the vessel 10.

The magnetostrictive exciting transducer 200 and the magnetostrictive receiving transducer 200' are preferably located on the same axis line A-A'. This is for the purpose of increasing the transmitting efficiency of the ultrasonic wave into the magnetostrictive receiving vibration 200'.

Fifth Embodiment

Figure 5:
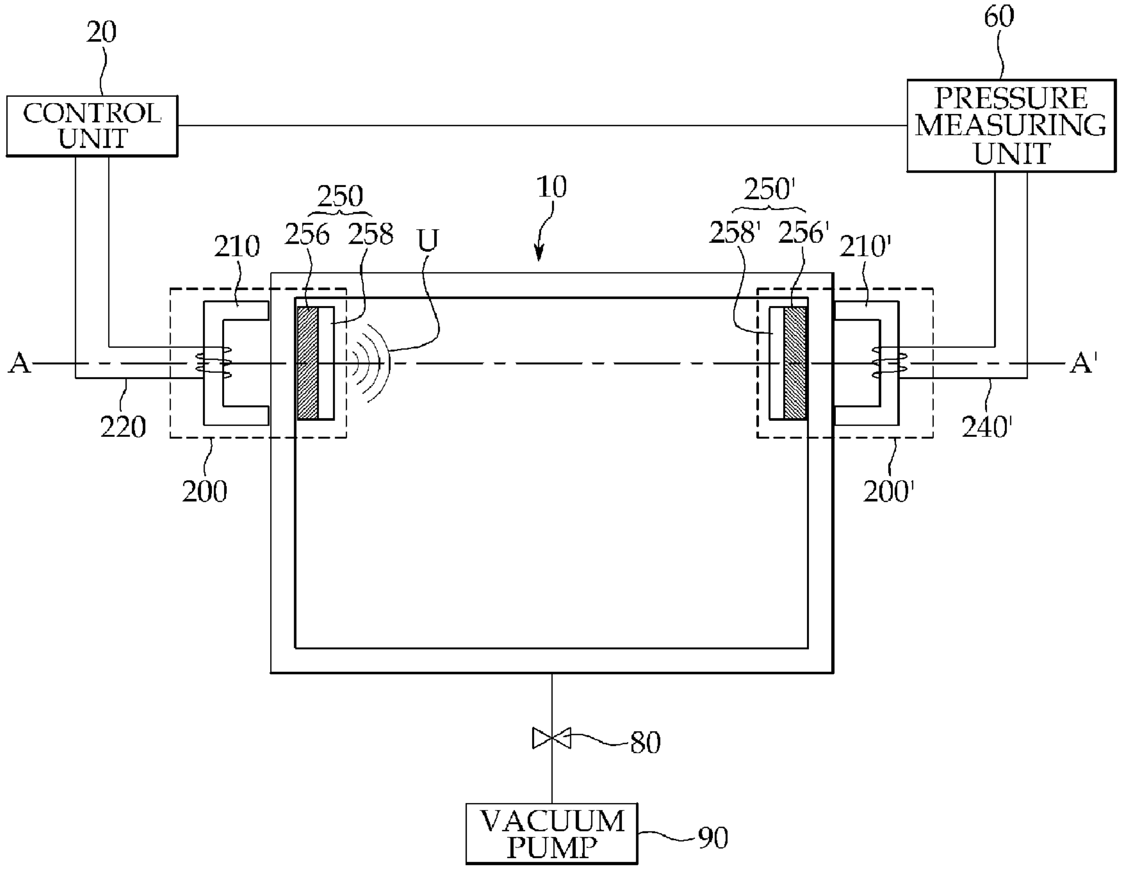
FIG. 5 is a diagram showing a state where a pressure measuring apparatus using a magnetostrictive acoustic transducer in accordance with a fifth embodiment of the present invention is constructed.

FIG. 5 is a diagram showing a pressure measuring apparatus using a magnetostrictive acoustic transducer in accordance with a fifth embodiment of the present invention. An exciting vibration unit 250 and a receiving vibration unit 250' can have the same construction as that of the third embodiment, as shown in FIG. 5.

That is, the exciting vibration unit 250 can include a magnetostrictive vibrating element 256 and an acoustic impedance matching layer 258, and the receiving vibration unit 250' can also include a magnetostrictive vibrating element 256' and a acoustic impedance matching layer 258'.

For description of the magnetostrictive vibrating elements 256, 256' and the acoustic impedance matching layers 258, 258', reference can be made to the contents of the third embodiment.

Meanwhile, unexplained reference numeral '90' denotes a vacuum pump for making the inside of the vessel 10 in a vacuum state, and '80' denotes a valve used to produce vacuum. The auxiliary devices are for producing the inside of the vessel 10 in a vacuum state and are not indispensable constituent elements of the pressure measuring apparatus of the present invention.

<Pressure Measuring Method>

The present invention employs magnetostriction, that is, the magnetostrictive phenomenon. Ultrasonic waves are generated based on the Joule effect, that is, a phenomenon in which ferroelectric materials are deformed mechanically according to a change in the magnetic field and sensed based on the Villari effect corresponding to an inverse magnetostriction. The Joule effect in which ultrasonic waves are generated is implemented by the magnetostrictive exciting transducer 200, and the Villari effect in which ultrasonic waves are sensed is implemented by the magnetostrictive receiving transducer 200'.

Method of First Embodiment

A method of measuring an internal pressure of the vessel 10 using the magnetostrictive exciting/receiving transducer 100 according to a first embodiment of the present invention is as follows. First, the pressure measuring apparatus is constructed (S10).

The excitation current signal of a predetermined value is supplied to the exciting coil unit 120 under current control of the control unit 20. When the current flows through the exciting coil unit 120, a magnetic field is induced to the first magnetization yoke 110 having the exciting coil unit 120 wound thereon. The induced magnetic field enables the magnetostrictive vibrating membrane 154 of the vibration unit 150, disposed inside the vessel 10, to vibrate, which generates ultrasonic waves (S20).

The generated ultrasonic waves travel inside the vessel 10. The traveling ultrasonic waves are reflected from the inner face of the vessel wall 10 and then returns back to the magnetostrictive exciting/receiving transducer 100 (S30). The travel path P is indicated in FIG. 1*a*.

The ultrasonic waves traveling inside the vessel 10 vibrate the magnetostrictive vibrating membrane 154 of the vibration unit 150. Therefore, the magnetostrictive vibrating membrane 154 generates a magnetic field since it is made of the magnetostrictive material. The generated magnetic field causes to produce electromotive force in the receiving coil unit 140 (S40). This is due to the Villari effect corresponding to the inverse performance of the step (S20) of generating the ultrasonic waves.

The voltage output induced by the electromotive force in the receiving coil unit 140 includes information about a signal of the ultrasonic waves traveling inside the vessel 10. The information can be the amplitude, waveform, etc. of the ultrasonic waves, and a time of flight, etc. of the ultrasonic waves can also be measured.

The pressure measuring unit 60 measures an internal pressure of the vessel 10 based on a signal of the ultrasonic waves received by the receiving coil unit 140, and an excitation current signal into the exciting coil unit 120 (S50).

The control unit 20 controls the excitation current signal supplied to the exciting coil unit 120. The control unit 20 supplies a predetermined excitation current signal, which is pertinent to a frequency and waveform of ultrasonic waves generated by the magnetostrictive exciting/receiving transducer 100, to the magnetostrictive exciting/receiving transducer 100 such that resonance of ultrasonic waves between the magnetostrictive vibrating membrane 154 and the inner face of the vessel wall 10 is induced. This is because, if resonance of ultrasonic waves is induced, the sensitivity of the pressure measuring unit can be increased.

It is to be noted that the pressure measuring method can also be applied to a case where the travel path P' of ultrasonic waves generated from the vibration unit 150 is opposite to that of FIG. 1*a*, as shown in FIG. 1*b*.

Method of Second Embodiment

A method of measuring pressure inside the vessel using the magnetostrictive exciting/receiving transducer 100 according to a second embodiment of the present invention is almost the same as that of the first embodiment. The method of the second embodiment differs from the method of the first embodiment in that the travel path P of ultrasonic waves traveling inside the vessel 10 becomes short since the reflection plate 190 is further included as shown in FIG. 2. Since the travel path P of the ultrasonic waves becomes short, the sensitivity of the pressure measuring unit is increased. Accordingly, accuracy in measuring an internal pressure of the vessel 10 can be improved.

The control unit 20 can control the excitation current signal, which is supplied to the exciting coil unit 120, such that a resonance of ultrasonic waves is induced between the vibration unit 150 and the reflection plate 190. This is also for the purpose of increasing the sensitivity of the pressure measuring unit by inducing resonance.

Method of Third Embodiment

In a method of measuring pressure inside the vessel using the pressure measuring apparatus employing the magnetostrictive acoustic transducer according to a third embodiment of the present invention, the pressure measuring apparatus is constructed almost identically to the method of the first embodiment. The method of the third embodiment differs from the method of the first embodiment in that the vibration unit 150, comprising the magnetostrictive vibrating element 156 and the acoustic impedance matching layer 158, is disposed inside the vessel 10 as shown in FIG. 3.

What a magnetic field is induced from the magnetostrictive exciting transducer 200 in response to the excitation current signal of the control unit 20 is identical to the method of the first embodiment. The magnetostrictive vibrating element 156 generates ultrasonic waves under the influence of the magnetic field induced by the exciting coil unit 120. The transmitting efficiency of the ultrasonic waves, which are generated from the magnetostrictive vibrating element 156, into the vessel 10 is increased while passing through the acoustic impedance matching layer 158.

Method of Fourth Embodiment

A method of measuring pressure inside the vessel using the pressure measuring apparatus employing the magnetostrictive acoustic transducer according to a fourth embodiment of the present invention is as follows. First, the pressure measuring apparatus is constructed (S10').

A predetermined excitation current signal is supplied to the exciting coil unit 220 under current control of the control unit 20 connected to the magnetostrictive exciting transducer 200. As the current flows through the exciting coil unit 220, a magnetic field is induced in the first magnetization yoke 210 having the exciting coil unit 220 wound thereon. The induced magnetic field vibrates the exciting magnetostrictive vibrating membrane 254 of the exciting vibration unit 250 disposed inside the vessel 10, and the vibration of the exciting magnetostrictive vibrating membrane 254 generates ultrasonic waves (S20').

The generated ultrasonic waves proceed toward the magnetostrictive receiving transducer 200' disposed on the other inner position of the vessel 10 (S30').

The ultrasonic waves traveling inside the vessel 10 vibrate the receiving vibration unit 250' of the magnetostrictive receiving transducer 200'. The receiving vibration unit 250', particularly, the receiving magnetostrictive vibrating membrane 254' is made of the magnetostrictive material and, therefore, generates a magnetic field. The generated magnetic field causes to produce electromotive force in the receiving coil unit 240' (S40').

The pressure measuring unit 60 measures an internal pressure of the vessel 10 based on a signal of the ultrasonic waves which is received by the receiving coil unit 240', and an excitation current signal into the exciting coil unit 220 (S50').

Method of Fifth Embodiment

A method of measuring pressure inside the vessel using the pressure measuring apparatus according to a fifth embodiment of the present invention is almost the same as that of the fourth embodiment. The method of the fifth embodiment differs from that of the fourth embodiment in that the exciting vibration unit 250 includes the magnetostrictive vibrating element 256 and the acoustic impedance matching layer 258 and the receiving vibration unit 250' includes the magnetostrictive vibrating element 256' and the acoustic impedance matching layer 258'.

Current flows through the exciting coil unit 220 under current control of the control unit 20. As the current flows through the exciting coil unit 220, a magnetic field is induced. The induced magnetic field causes the magnetostrictive vibrating element 256 to generate ultrasonic waves. The transmitting efficiency of the generated ultrasonic waves is increased while passing through the acoustic impedance matching layer 258 (S30").

The transmitting efficiency of the ultrasonic waves traveling inside the vessel 10 is increased while passing through the acoustic impedance matching layer 258 disposed on the other side of the vessel 10. The ultrasonic wave causes to induce a magnetic field in the magnetostrictive vibrating element 256'. Thus, an electromotive force by the induced magnetic field is produced in the receiving coil unit 240' (S40"). The pressure measuring unit 60 measures an internal pressure of the vessel based on a signal of the ultrasonic waves received by the receiving coil unit 240', and an excitation current signal into the exciting coil unit 220.

MODIFICATION EXAMPLE

The present invention can also be applied to a case where the vessel 10 has a high vacuum state of $10^{-5}$ to $10^{-9}$ Pa as well as a case where the vessel 10 has a low vacuum state of 1 to $10^{-5}$ Pa.

The present invention can be applied to a case where an internal pressure of a vessel, having an atmospheric pressure or higher, is to be measured as well as a case where a vessel has a low vacuum state or a high vacuum state and can also applied to a case where a vessel is filled with not gas, but solid or liquid.

As an alternative embodiment of the present invention, the first magnetization yokes 110, 210, the second magnetization yoke 210', the exciting vibration unit magnetization yoke 252 and the receiving vibration unit magnetization yoke 254' can be fabricated to have the same shape as that of the first magnetization yoke 110 shown in FIG. 4 or can be fabricated in various ways other than the above shape.

The pressure measuring apparatus and method of the present invention can be generally applied to the semiconductor or the LCD fabrication process. The pressure measuring apparatus and method of the present invention can also be applied to all the industry fields in which the degree of vacuum, that is, pressure inside a vessel is to be measured.

The pressure measuring apparatus using the magnetostrictive acoustic transducer according to the present invention has the vibration unit disposed inside the vessel and the coil disposed outside the vessel, so that ultrasonic waves can be directly transmitted to the inside of the vessel. Accordingly, there are advantages in that energy attenuation can be minimized and accuracy of measured pressure can be improved.

Furthermore, the present invention has an advantage in that the possibility of leakage can be minimized since pressure inside a vessel is measured by generating ultrasonic waves without damage or modification of the vessel.

Moreover, the present invention has an advantage in that it can measure an internal pressure, that is, the degree of vacuum of a vessel even in a high vacuum state or a high atmospheric pressure or higher by further forming the reflection plate or inducing resonance of ultrasonic waves.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for measuring pressure inside a vessel using a magnetostrictive acoustic transducer employing ultrasonic waves, the apparatus comprising:

a magnetostrictive exciting/receiving transducer comprising an exciting coil unit wound on a first magnetization yoke disposed on an outer position of a vessel, a receiving coil unit wound on the first magnetization yoke, and a vibration unit disposed on an inner position of the vessel in which the first magnetization yoke is installed;

a control unit for supplying a predetermined excitation current signal to the exciting coil unit; and a pressure measuring unit for measuring an internal pressure of the vessel based on an ultrasonic wave signal received by the receiving coil unit and an excitation current signal into the exciting coil unit, wherein the control unit supplies a predetermined excitation current signal to the magnetostrictive exciting/receiving transducer such that a resonance of the ultrasonic waves is induced between the vibration unit and the inner face of the vessel wall.

2. The apparatus according to claim 1, wherein the vibration unit comprises a vibration unit magnetization yoke and a magnetostrictive vibrating membrane.

3. The apparatus according to claim 2, wherein the magnetostrictive vibrating membrane is composed of a single layer or a plurality of layers.

4. The apparatus according to claim 3, wherein the single layer or the plurality of layers constituting the magnetostrictive vibrating membrane include a material with strong magnetostriction, such as nickel, iron-cobalt alloy or Galfenol materials.

5. The apparatus according to claim 1, wherein the vibration unit comprises a magnetostrictive vibrating element and an acoustic impedance matching layer.

6. The apparatus according to claim 5, wherein the magnetostrictive vibrating element is made of a material with strong magnetostriction, such as Terfenol-D.

7. The apparatus according to claim 1, further comprising a reflection plate for reflecting the ultrasonic waves inside the vessel.

8. The apparatus according to claim 1, wherein the first magnetization yoke is made of a material with a high magnetic permeability, such as ferrite.

9. The apparatus according to claim 7, wherein the control unit supplies a predetermined excitation current signal to the magnetostrictive exciting/receiving transducer such that a resonance of the ultrasonic waves is induced between the vibration unit and the reflection plate.

10. An apparatus for measuring pressure inside a vessel using a magnetostrictive acoustic transducer employing ultrasonic waves, the apparatus comprising:

a magnetostrictive exciting transducer comprising an exciting coil unit wound on a first magnetization yoke disposed on an outer position of a vessel and an exciting vibration unit disposed on an inner position of the vessel in which the first magnetization yoke is disposed;

a magnetostrictive receiving transducer comprising a receiving coil unit wound on a second magnetization yoke disposed on the other outer position of the vessel and a receiving vibration unit disposed on the other inner position of the vessel in which the second magnetization yoke is disposed;

a control unit for supplying a predetermined excitation current signal to the exciting coil unit; and a pressure measuring unit for measuring an internal pressure of the vessel based on an ultrasonic wave signal received by the receiving coil unit and an excitation current signal into the exciting coil unit, wherein the control unit supplies a predetermined excitation current signal to the magnetostrictive exciting transducer such that a resonance of ultrasonic waves generated from the magnetostrictive exciting transducer is induced between the vibration unit of the magnetostrictive exciting transducer and the magnetostrictive receiving transducer.

11. The apparatus according to claim 10, wherein the magnetostrictive exciting transducer and the magnetostrictive receiving transducer are place on the same axis line (A-A').

12. The apparatus according to claim 10, wherein the first magnetization yoke and the second magnetization yoke are made of a material with a high magnetic permeability, such as ferrite.

13. The apparatus according to claim 10, wherein the exciting vibration unit comprises an exciting vibration unit magnetization yoke and an exciting magnetostrictive vibrating membrane.

14. The apparatus according to claim 10, wherein the receiving vibration unit comprises a receiving vibration unit magnetization yoke and a receiving magnetostrictive vibrating membrane.

15. The apparatus according to claim 10, wherein the exciting vibration unit and the receiving vibration unit comprise a magnetostrictive vibrating element and an acoustic impedance matching layer and a magnetostrictive vibrating element and an acoustic impedance matching layer, respectively.

* * * * *